United States Patent

[11] 3,603,674

[72] Inventors John C. Abromavage
 Tempe;
 James F. George, Phoenix, both of, Ariz.
[21] Appl. No. 878,095
[22] Filed Nov. 19, 1969
[45] Patented Sept. 7, 1971
[73] Assignee Arcoa, Incorporated
 Phoenix, Ariz.

[54] EYE-TESTING SYSTEM AND APPARATUS
 3 Claims, 8 Drawing Figs.
[52] U.S. Cl.................................................. 351/37,
 248/327, 248/333
[51] Int. Cl................................................. A61b 3/00
[50] Field of Search........................................ 351/23, 37,
 38, 32, 1, 17, 33, 36; 250/50, 91, 92; 248/11, 17,
 320, 323, 327, 333; 223/120; 240/67

[56] References Cited
 UNITED STATES PATENTS
 678,642 7/1901 Chambers..................... 351/38
 698,833 4/1902 Hardy............................ 351/17
 1,193,735 8/1916 Sutter............................ 351/37 X
 1,780,291 11/1930 Cameron....................... 351/37
 1,879,501 9/1932 Rigler............................ 351/37 X
 3,012,472 12/1961 Feinberg....................... 351/36
 3,263,627 8/1966 Russell, Sr.................... 351/38 UX Primary Examiner—David Schonberg
Assistant Examiner—Paul A. Sacher
Attorney—David H. Semmes ABSTRACT: An eye test visual combination for vertically and horizontally positioning charts, screens and the like for stereoscopic vision testing, visual field testing and close reading testing. A system consisting preferably of an electrohydraulic device is used for the positioning of the charts and screens in combination with a frame and adjustable track system and selectively operable multiple display charts to effect different tests.

PATENTED SEP 7 1971

INVENTORS
JOHN C. ABROMAVAGE
JAMES F. GEORGE

BY David H. Semmes
ATTORNEY

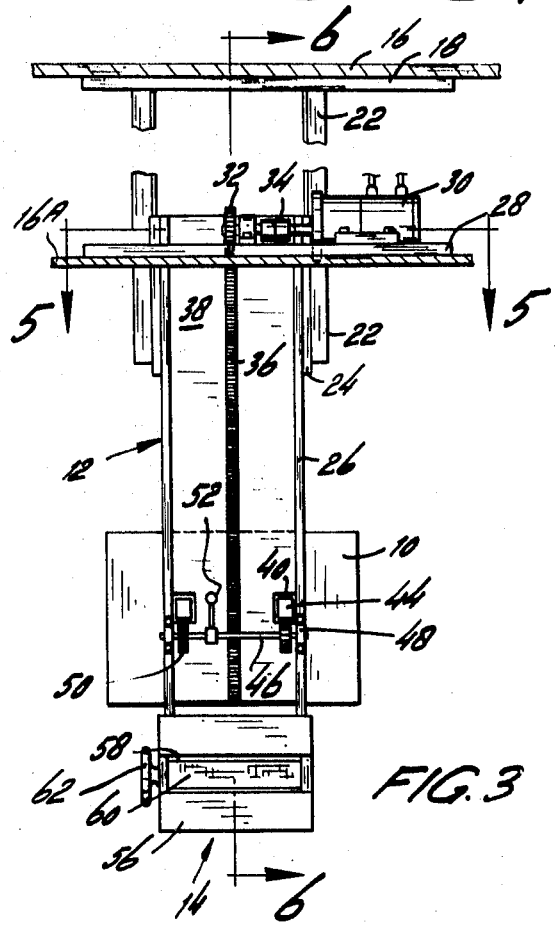

EYE-TESTING SYSTEM AND APPARATUS

BACKGROUND OF THE INVENTION

Eye tests or examinations require the use of a multiplicity of different apparatus and techniques. In performing such eye examinations in the past, practitioners or technicians have not had available s system and apparatus for readily and positively adjusting various of the test units or devices for rapid and accurate presentation to a test subject and as a result the procedure frequently lacked in efficiency and involved a time loss factor.

SUMMARY OF THE INVENTION

The present invention constitutes improvements in construction, arrangement and a system particularly adapted for laboratory use in conducting eye tests or examinations and especially for selectively presenting visual test combinations in a rapid, accurate and efficient manner. More particularly the present visual combination system is operable to vertically and horizontally adjust and present in proper position with respect to a test subject the various charts and screens involved in stereoscopic vision testing, visual field testing, and close reading testing. The system includes an electrohydraulic mechanism in conjunction with a frame and gearing structure to effect the required positioning and adjustment. Not only is a substantial time saving factor possible but the positioning and adjustment of the individual components used in the test is accurate and positive in operation.

Additional objects and advantages of the invention will be more readily apparent from the following detailed description of an embodiment thereof taken together with the accompanying drawings in which:

FIG. 3 is a rear elevational view of the apparatus and system;

FIG. 4 is a top view of a portion of the apparatus disclosing slide details for vertical component adjustment and positioning;

FIG. 5 is a sectional view taken on line 5—5, of FIG. 3;

FIG. 6 is a side elevational view of the apparatus of FIG. 3;

FIG. 7 is an enlarged fragmentary view, partly in section, of a detail A in FIG. 5; and FIG. 8 is a fragmentary side view of the detail of FIG. 7.

Figures 1, 2:
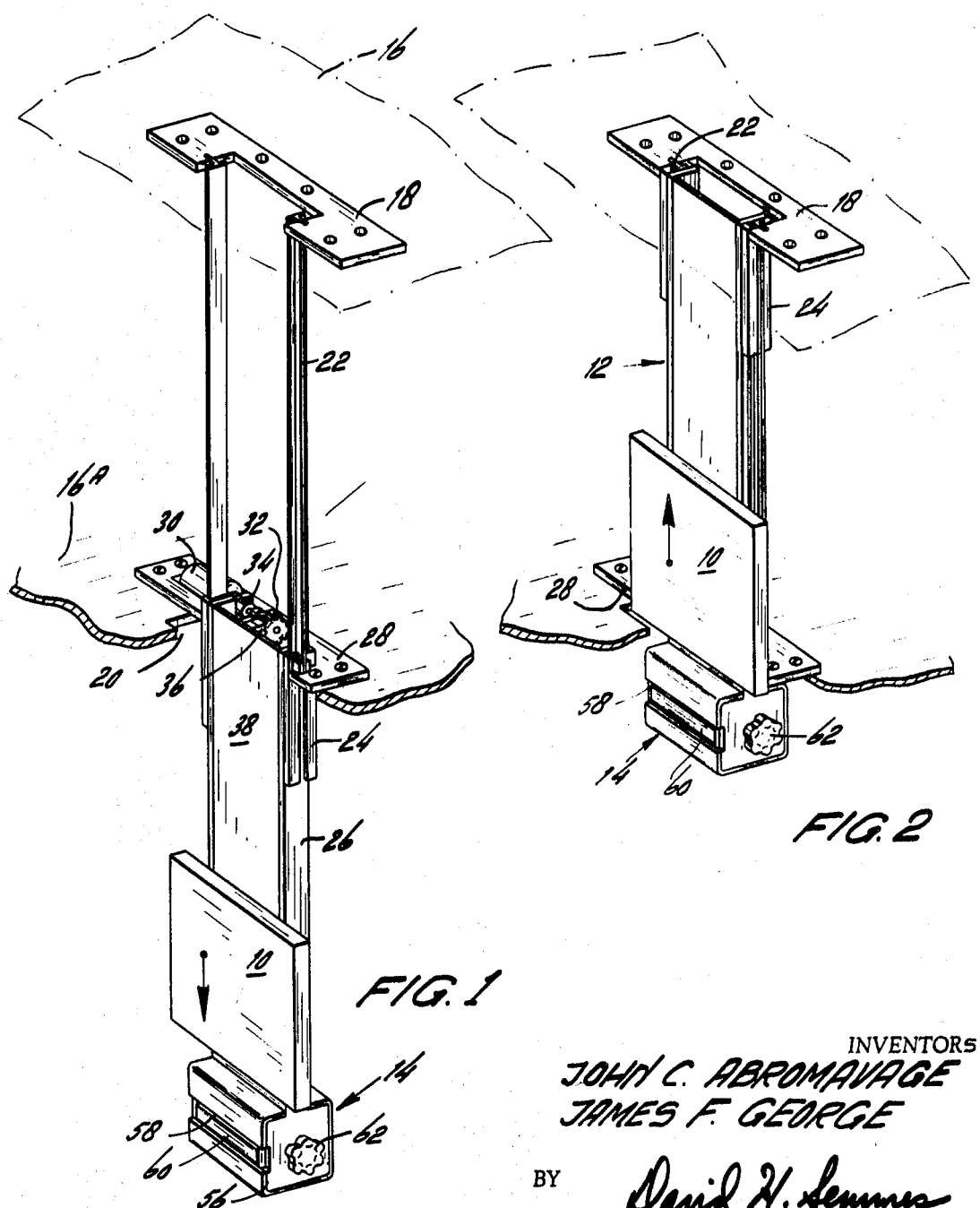
FIG. 1 is a front perspective view of an eye test visual combination system in accordance with the invention.
FIG. 2 is a perspective view similar to FIG. 1 with visual test components in a retracted or inoperative position.

Referring now more specifically to the drawings which disclose the test components as mounted for positioning and adjustment, a visual field screen 10 is mounted on a frame generally designated 12 and adapted for raising and lowering to inoperative and operative positions by mechanism to be hereinafter described. A combination close reading and stereoscopic vision cylinder, generally indicated 14, is also attached to the frame for adjustable positioning in the same manner. FIG. 1 discloses the lowered or operative position of the test components to an adjusted eye focused relationship with a test subject or patient while in FIG. 2 the components are shown in a raised or inoperative position.

The apparatus is adapted for mounting on a ceiling structure such as at 16 by means of an attachment plate 18 which can for example be secured to studs from an upper concrete or plaster ceiling by screws, bolts or the like passing through the attachment plate. Depending T-beam tracks 22 are secured to attachment plate 18 and extend downwardly into a test room or compartment. The frame 12 of the visual combination system is slidably mounted on the tracks by nylon track grips 24, or a like material, which are attached to beams 26 constituting a portion of the frame and on which are mounted the screen and cylinder as shown in more detail in FIG. 3 for example. An operating mechanism support plate 28 is mounted on and affixed to the ceiling 16A and mounts thereon a two-way reversible hydraulic motor 30 operatably connected to a pinion gear 32 or the like through a shaft and collar connection generally designated 34. The pinion 32 meshes with a toothed rack 36. The rack 36 is attached to a back plate 38 which is interconnected between and with the beams 26 for conjoint movement therewith. When the hydraulic motor is operated to rotate the pinion 32, by coaction with rack 36, the beams 26 and therefore the frame are raised or lowered through opening 20 with respect to the ceiling 16A for adjustable extension into an examination room.

The visual field screen 10 is attached to box beams 40 or the like having a toothed rack 42 formed on the underside of sliders 44 engaged within the box beam and affixed to the screen 10. A shaft 46 is rotatably journaled at its ends at 48 in beams 26 and mounts thereon toothed gears 50 which engage with the toothed rack 42 of the slides 44. A handle 52 is attached to shaft 46 and as indicated by arrow 54 (FIG. 6) is adapted for rotation to thereby horizontally move the screen 10 into a horizontally adjusted position for correct patient testing.

From the foregoing it will be readily apparent that the screen can be vertically adjustably positioned as well as horizontally adjusted to suit different conditions and patients for the testing procedure.

The combination close reading and stereoscopic vision cylinder 14 includes a casing 56 having a front opening 58 therein which constitutes a viewing opening. A cylinder 60 is rotatably mounted in casing 56 and has an operating knob 62 for revolving the cylinder. In one form of the invention for example the cylinder can include or incorporate thirteen sides or displays to display or present desired charts for close reading and stereoscopic vision testing upon manual rotation of the knob. The cylinder can have means such as a spring-loaded nylon ball coacting with detents on one side of the cylinder or similar mechanism for holding a fixed position of the cylinder as adjusted.

While the structure and operation of the visual combination system will be apparent from the foregoing description, summarizing operation, for raising, the bottom surface of the cylinder case is raised to a height of for example 76 inches above a test room floor by means of the hydraulic motor which drives vertically a gear rack attached to the frame of the system and lowering is accomplished by the same mechanism. It is possible to vertically position the components in different positions by utilizing for example microswitches attached to the T-beam tracks to control motor operation through a three-position solenoid valve actuatable by a manual switch. Horizontal positioning of the visual field screen can be accomplished by manual movement of a lever which can through the rack and toothed gear arrangement pull the screen in or out for example one inch. Adjustment of the display chart cylinder is accomplished by rotating the control knob. The overall system and components are kept in alignment vertically while being raised and lowered by the use of nylon grips on the side of the frame and which run on the T-beam tracks.

While a preferred embodiment of apparatus incorporating the system of the invention has been set forth in the drawings and description, minor changes and modifications can be effected therein without departing from the spirit and scope of the invention as defined in and limited solely by the appended claims.

1. In combination with an examination room, eye-testing apparatus adapted for conducting eye tests in the room, comprising:
   a. a fixed vertical support having a lower portion thereof extending downwardly into said room;
   b. a vertically movable frame mounted on said fixed support;
   c. at least one eye test apparatus component attached to said movable frame proximate the bottom end thereof within said room; and
   d. means for raising and lowering said movable frame on said support and said eye test apparatus component therewith for lowering and raising the component in said room into and out of operative eye-testing positions; and e. said room including a ceiling, an opening through said ceiling, said vertical support being mounted through said opening and having said lower portion extending downward through said opening into said room, said upper portion extending upwardly above said ceiling, said eye test component being attached to and positioned on said movable frame below said ceiling and positionable in said room with respect to said ceiling into and out of operative eye testing positions; and f. Wherein the mounting means includes spaced-apart vertically disposed T-beam tracks, said frame including depending legs having T-beam-gripping members thereon slidably engaged with said T-beams and permitting vertical sliding movement of said frame with respect to said T-beams; and g. further including a back plate fixed between the frame depending legs, a vertically disposed gear rack secured on said back plate, a toothed pinion rotatably mounted and in operative engagement with said rack, and means for driving said pinion to raise or lower said rack and together therewith said plate and said test component by coaction of said rack and said pinion.

2. In the combination of claim 1, the test apparatus including a visual field screen, and means mounting said visual field screen on said movable frame for horizontal adjustment of said screen for proper patient positionment with the apparatus in lowered test position.

3. In the combination of claim 2, horizontal arms attached to and mounting said screen, a channel member for each said arm attached to said frame, said arms being slidable within said channel members, said arms having a toothed rack on the under surfaces thereof, rotatably mounted pinions engaging with said racks and means for rotating said pinions for horizontal adjustment of said screen by coaction of said racks and said pinions.